(12) United States Patent
Lund

(10) Patent No.: US 8,437,352 B2
(45) Date of Patent: May 7, 2013

(54) METHOD AND SYSTEM FOR POWER CONTROL BASED ON APPLICATION AWARENESS IN A PACKET NETWORK SWITCH

(75) Inventor: Martin Lund, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 965 days.

(21) Appl. No.: 11/442,928

(22) Filed: May 30, 2006

(65) Prior Publication Data
US 2007/0280239 A1  Dec. 6, 2007

(51) Int. Cl.
H04L 12/28 (2006.01)
H04W 24/00 (2009.01)
H04W 4/00 (2009.01)

(52) U.S. Cl.
USPC ........... 370/392; 370/230; 370/389; 370/401; 370/412; 370/428; 370/232; 370/252; 370/350; 455/456.2; 455/435.2

(58) Field of Classification Search .......... 370/229–503, 370/395.52; 455/435.1–457
See application file for complete search history.

(56) References Cited

U.S. PATENT DOCUMENTS

| | | | | |
|---|---|---|---|---|
| 5,488,409 A | * | 1/1996 | Yuen et al. | 725/41 |
| 5,781,538 A | * | 7/1998 | Ganesan et al. | 370/310 |
| 5,812,951 A | * | 9/1998 | Ganesan et al. | 455/445 |
| 5,949,777 A | * | 9/1999 | Uyesugi et al. | 370/345 |
| 5,983,353 A | * | 11/1999 | McHann, Jr. | 713/310 |
| 6,091,884 A | * | 7/2000 | Yuen et al. | 386/83 |
| 6,115,390 A | * | 9/2000 | Chuah | 370/443 |
| 6,205,122 B1 | * | 3/2001 | Sharon et al. | 370/254 |
| 6,219,422 B1 | * | 4/2001 | Sato | 380/240 |
| 6,226,277 B1 | * | 5/2001 | Chuah | 370/328 |
| D458,905 S | * | 6/2002 | Jahne et al. | D13/158 |
| 6,466,985 B1 | * | 10/2002 | Goyal et al. | 709/238 |
| 6,485,100 B1 | * | 11/2002 | Hitt | 297/228.13 |
| 6,487,362 B1 | * | 11/2002 | Yuen et al. | 386/83 |
| 6,519,636 B2 | * | 2/2003 | Engel et al. | 709/223 |
| 6,538,990 B1 | * | 3/2003 | Prorock | 370/229 |
| 6,610,172 B1 | * | 8/2003 | Lund et al. | 162/72 |
| 6,633,835 B1 | * | 10/2003 | Moran et al. | 702/190 |
| 6,646,985 B1 | * | 11/2003 | Park et al. | 370/229 |
| 6,647,419 B1 | * | 11/2003 | Mogul | 709/226 |
| 6,701,060 B2 | * | 3/2004 | Yuen et al. | 386/46 |
| 6,801,940 B1 | * | 10/2004 | Moran et al. | 709/224 |
| 6,845,100 B1 | * | 1/2005 | Rinne | 370/395.43 |
| 6,859,154 B2 | * | 2/2005 | Lund et al. | 341/65 |
| 6,870,811 B2 | * | 3/2005 | Barker et al. | 370/235 |
| 6,910,134 B1 | * | 6/2005 | Maher et al. | 726/24 |
| 6,911,922 B2 | * | 6/2005 | Lund et al. | 341/65 |

(Continued)

*Primary Examiner* — Ayaz Sheikh
*Assistant Examiner* — Venkatesh Haliyur
(74) *Attorney, Agent, or Firm* — Thomas | Horstemeyer, LLP

(57) ABSTRACT

Certain aspects of a method and system for a power control based on application awareness in a packet network switch are provided. Data communication flow may be monitored in ports in a packet network switch based on packet classification. Ports where data flow is not detected may have at least some functionality disabled to reduce power consumption. In this regard, a power saving mode may be utilized for disabling at least some functionality in a switch port, such as Ethernet ports, for example. A partially disabled port may be fully enabled when monitoring detects active data communication flow in that port. Port functionality may be enabled or disabled sequentially, for example. In some instances, a physical layer portion of the packet network switch may be utilized to adjust power in a port based on the data communication flow.

21 Claims, 14 Drawing Sheets

U.S. PATENT DOCUMENTS

| | | | |
|---|---|---|---|
| 6,914,883 B2 * | 7/2005 | Dharanikota | 370/230.1 |
| 6,930,621 B2 * | 8/2005 | Lund et al. | 341/65 |
| 6,992,980 B2 * | 1/2006 | Brezzo et al. | 370/229 |
| 6,996,117 B2 * | 2/2006 | Lee et al. | 370/429 |
| 7,020,701 B1 * | 3/2006 | Gelvin et al. | 709/224 |
| 7,095,715 B2 * | 8/2006 | Buckman et al. | 370/230 |
| 7,111,102 B2 * | 9/2006 | Doak et al. | 710/305 |
| 7,197,025 B2 * | 3/2007 | Chuah | 370/338 |
| 7,239,636 B2 * | 7/2007 | Kadambi et al. | 370/395.2 |
| 7,299,277 B1 * | 11/2007 | Moran et al. | 709/224 |
| 7,349,403 B2 * | 3/2008 | Lee et al. | 370/395.21 |
| 7,366,101 B1 * | 4/2008 | Varier et al. | 370/241 |
| 7,409,450 B2 * | 8/2008 | Jorgensen | 709/226 |
| 7,426,181 B1 * | 9/2008 | Feroz et al. | 370/232 |
| 7,453,892 B2 * | 11/2008 | Buskirk et al. | 370/401 |
| 7,463,651 B2 * | 12/2008 | Lund et al. | 370/476 |
| 7,471,629 B2 * | 12/2008 | Melpignano | 370/232 |
| 7,519,057 B2 * | 4/2009 | Lund et al. | 370/389 |
| 7,535,836 B2 * | 5/2009 | Lund | 370/230 |
| 7,539,175 B2 * | 5/2009 | White et al. | 370/350 |
| 7,606,147 B2 * | 10/2009 | Luft et al. | 370/229 |
| 7,626,931 B2 * | 12/2009 | Wu et al. | 370/232 |
| 7,684,432 B2 * | 3/2010 | Adamczyk et al. | 370/463 |
| 7,730,296 B2 * | 6/2010 | Lund | 713/150 |
| 7,835,363 B2 * | 11/2010 | Lund et al. | 370/230 |
| 7,966,422 B2 * | 6/2011 | Lund | 709/245 |
| 8,125,904 B2 * | 2/2012 | Lund | 370/231 |
| 8,174,970 B2 * | 5/2012 | Adamczyk et al. | 370/230 |
| 8,225,389 B2 * | 7/2012 | Lund | 726/13 |
| 2003/0021229 A1 * | 1/2003 | Kadambi et al. | 370/229 |
| 2003/0185157 A1 * | 10/2003 | Chen et al. | 370/235 |
| 2004/0155801 A1 * | 8/2004 | Lund et al. | 341/59 |
| 2004/0156314 A1 * | 8/2004 | Lund et al. | 370/230 |
| 2004/0156317 A1 * | 8/2004 | Lund | 370/235 |
| 2004/0158703 A1 * | 8/2004 | Lund | 713/150 |
| 2004/0160900 A1 * | 8/2004 | Lund et al. | 370/252 |
| 2004/0196165 A1 * | 10/2004 | Lund et al. | 341/58 |
| 2004/0199567 A1 * | 10/2004 | Lund | 709/201 |
| 2004/0199568 A1 * | 10/2004 | Lund | 709/201 |
| 2004/0199569 A1 * | 10/2004 | Kalkunte et al. | 709/201 |
| 2004/0202182 A1 * | 10/2004 | Lund et al. | 370/395.21 |
| 2004/0205000 A1 * | 10/2004 | Lund | 705/21 |
| 2004/0228356 A1 * | 11/2004 | Adamczyk et al. | 370/401 |
| 2004/0257248 A1 * | 12/2004 | Lund et al. | 341/58 |
| 2005/0002335 A1 * | 1/2005 | Adamczyk et al. | 370/230 |
| 2005/0138238 A1 * | 6/2005 | Tierney et al. | 710/33 |
| 2005/0219120 A1 * | 10/2005 | Chang | 342/357.13 |
| 2006/0034295 A1 * | 2/2006 | Cherukuri et al. | 370/395.52 |
| 2006/0098572 A1 * | 5/2006 | Zhang et al. | 370/229 |
| 2007/0280106 A1 * | 12/2007 | Lund | 370/230 |
| 2007/0280111 A1 * | 12/2007 | Lund | 370/235 |
| 2007/0280238 A1 * | 12/2007 | Lund | 370/392 |
| 2007/0280239 A1 * | 12/2007 | Lund | 370/392 |
| 2007/0280277 A1 * | 12/2007 | Lund | 370/412 |

* cited by examiner

METHOD AND SYSTEM FOR POWER CONTROL BASED ON APPLICATION AWARENESS IN A PACKET NETWORK SWITCH

CROSS-REFERENCE TO RELATED APPLICATIONS/INCORPORATION BY REFERENCE

This application makes reference to:
U.S. application Ser. No. 11/442,745 filed on May 30, 2006;
U.S. application Ser. No. 11/442,850 filed on May 30, 2006;
U.S. application Ser. No. 11/442,801 filed on May 30, 2006; and
U.S. application Ser. No. 11/443,382 filed on May 30, 2006.

Each of the above stated applications is hereby incorporated by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of signals in networking systems. More specifically, certain embodiments of the invention relate to a method and system for power control based on application awareness in a packet network switch.

BACKGROUND OF THE INVENTION

In a telecommunications network, a switch is a device that channels incoming data from any of a plurality of input ports to at least one output port that will communicate the data toward its intended destination. In the traditional circuit-switched telephone network, one or more switches are used to set up a dedicated temporary connection or circuit for an exchange between two or more parties. On an Ethernet local area network (LAN), a switch determines which output port to forward a particular packet frame based on the medium access control (MAC) address of the received packet frame. In a packet switched IP network, a switch may determine which output port to use to route the network packet based on the IP address of each packet.

Various software algorithms and applications have been developed to discover the topology of a network and detect the presence of loops in a network. Whenever a loop is detected, the traffic on those ports that form the loop may be blocked. A blocked port may not be used to forward traffic since it would result in the forwarded traffic being looped back and subsequently received at the output port from which it was communicated. Standardized protocols such as spanning tree and rapid spanning tree are utilized to detect and prevent occurrences of loops within a network. Such methods for detecting and preventing loops may be referred to as active methods.

A loop generally creates a high concentration of traffic, which excludes other applications from communicating data over the input and output ports that form the loop. If a sufficient amount of switch ports are placed in a loop, this may render the switch inoperable. This may occur in instances where traffic in a loop is also being broadcasted to other ports and may reduce those portions of a network that is served solely by the switch.

In addition to considerations regarding the effect that loops may have on the overall traffic levels through a switch, traffic levels may also relate to the effectiveness with which a switch may consume power. In this regard, switches may need to implement power control mechanisms that optimize power consumption in accordance with traffic demands.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for power control based on application awareness in a packet network switch, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for a power control based on application awareness in a packet network switch. Data communication flow may be monitored in ports in a packet network switch based on packet classification. Ports where data flow is not detected may have at least some functionality disabled to reduce power consumption. In this regard, a power saving mode may be utilized for disabling at least some functionality of a port, such as Ethernet ports, for example. A partially disabled port may be fully enabled when monitoring detects active data communication flow in that port. Port functionality may be enabled or disabled sequentially, for example. In some instances, an OSI physical layer (PHY) portion of the packet network switch may be utilized to adjust power in a port based on the data communication flow. The physical layer portion of the packet network switch may comprise the PHY layer and/or the medium access control (MAC) layer, for example.

Figure 1A:
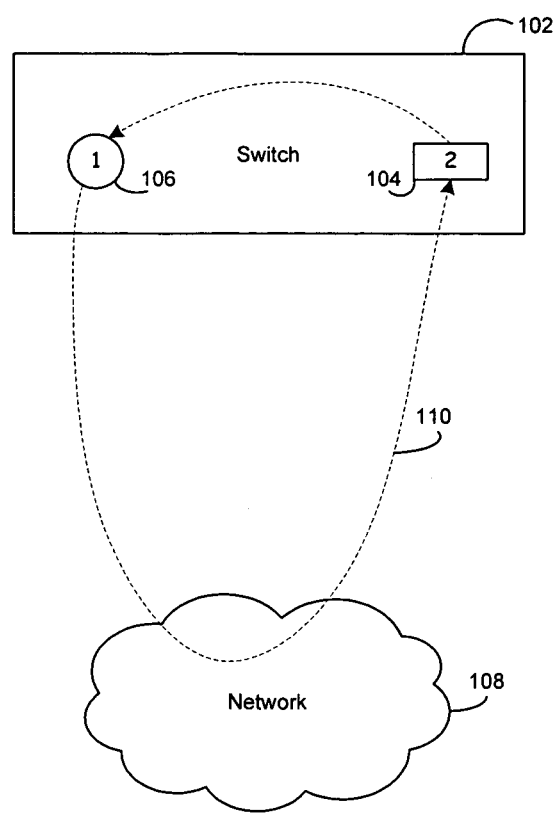
FIG. 1A is a diagram illustrating an exemplary loop in a network that may be utilized in connection with an embodiment of the invention.

FIG. 1A is a diagram illustrating an exemplary loop in a network that may be utilized in connection with an embodiment of the invention. Referring to FIG. 1A, there is shown a packet network switch 102, a network 108 and a network loop data path 110. The packet network switch 102 may comprise an input port 2 104 and an output port 1 106.

The loop 110 illustrates data being communicated from the output port 1 106 of the packet network switch 102 through the network 108 and being received at an input port 2 104 of the packet network switch 102. The same data that is received at the input port 2 104 may be then communicated back to the output port 1 106, thereby creating a loop. A loop 110 may occur when data is transmitted from the first output switch port 106, received at a first input port 104 of the same switch 102 and is communicated back to the first output switch port 106.

In accordance with various embodiments of the invention, a passive methodology may be utilized to detect and handle loops that may occur in a network 108. This may be utilized in instances where the spanning tree or rapid spanning tree algorithm is not running. Each frame handled by the switch 102 may be tracked by a classifier that examines each frame to determine its identity. For example, a hashing operation may be performed across each received frame and the corresponding hash information related to each frame may be stored, for example, in a table in memory. The hash information may be examined to determine whether there are multiple occurrences of the same received frame. The accuracy of the hashing algorithm may adequately detect multiple frame occurrences. If examination of the hashed information indicates that a frame is to be communicated through the switch 102 at a rate that may exceed a threshold or other determined rate, then this may indicate the presence of a loop in the network 108. In most networks, this may be a fair assumption since there would be no value in sending the same information through the switch constantly, except for testing purposes.

Figure 1B:
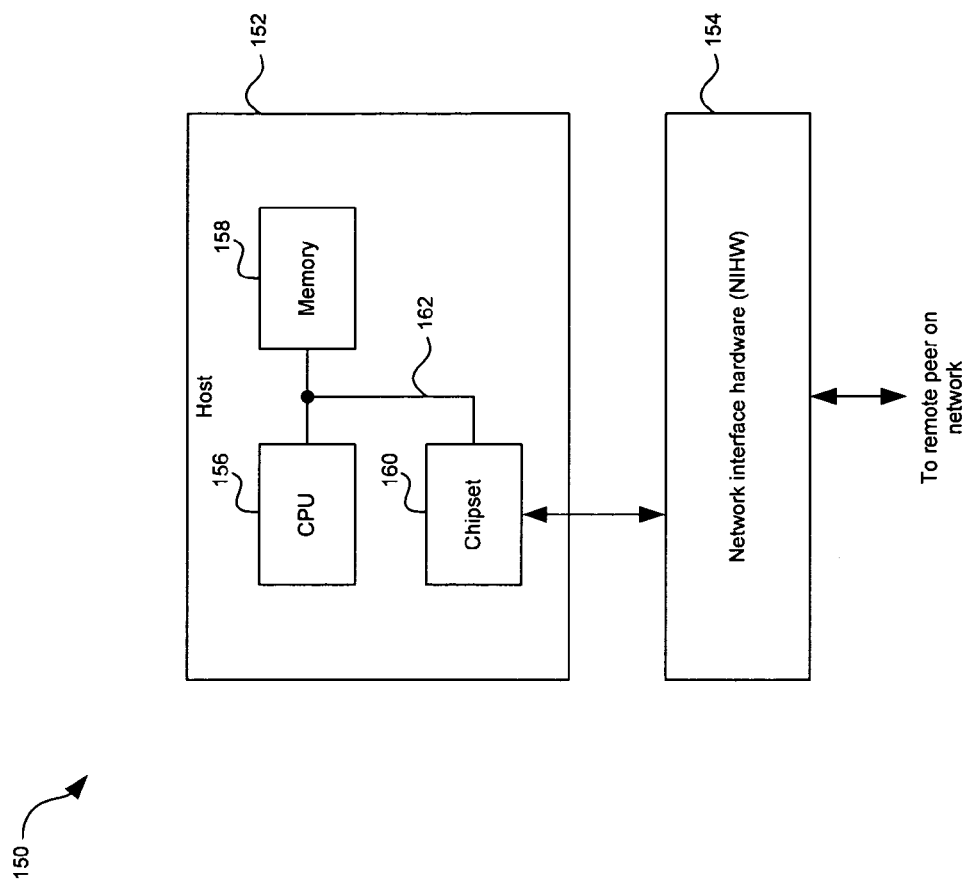
FIG. 1B is a block diagram illustrating a host with a separate network interface hardware (NIHW) block, in accordance with an embodiment of the invention.

FIG. 1B is a block diagram illustrating a host with a separate network interface hardware (NIHW) block, in accordance with an embodiment of the invention. Referring to FIG. 1B, there is shown a networking system 150, such as a server, a client, or a similar network machine, for example, that may comprise a host 152 and a network interface hardware (NIHW) device 154. The host 152 may comprise a central processing unit (CPU) 156, a memory 158, and a chipset 160. The CPU 156, the memory 158, and the chipset 160 may be communicatively coupled via, for example, a bus 162.

The networking system 150 may enable operation or support of various networking protocols. For example, the networking system 150 may enable supporting of transport control protocol/Internet protocol (TCP/IP) connections. In this regard, the networking system 150 may enable supporting of Internet control message protocol (ICMP), address resolution protocol (ARP), stream control transmission protocol (SCTP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP.

The host 152 may enable setup parameters for network connections. For example, the host 152 may setup transport layer parameters comprising information that support time stamping, window scaling, delayed acknowledgment policy, flow control scheme to be used, congestion handling, selective acknowledgement (SACK), buffers to be used, and/or other transport related parameters. The host 152 may also setup network layer parameters comprising information that supports IPv4 or IPv6, for example, and options such as no fragments and/or hop limit. The host 152 may also setup data link layer parameters comprising information that supports virtual local area networks (VLAN) and source address to be used, for example.

The CPU 156 may comprise suitable logic, circuitry, and/or code that may enable supporting of the management and/or performance of networking operations associated with remote peers or clients on a network. The CPU 156 may also enable supporting of the management and/or performance of service applications that may be provided to the remote clients on the network.

The memory 158 may comprise suitable logic, circuitry, and/or code that may enable storage of information regarding the networking operations and/or service applications supported by the CPU 156. The chipset 160 may comprise suitable logic, circuitry, and/or code that may enable supporting of memory management, PCI master and arbitrator, graphics interface, I/O master for USB, audio, and/or peripheral devices, for example. In this regard, the chipset 160 may comprise at least one integrated circuit (IC) that provides services in support of the CPU 156 operations. In some instances, the services provided by the chipset 160 may be implemented in separate ICs. The choice of one or more ICs for implementing the chipset 160 may be based on the number and/or type of services provided.

The NIHW device 154 may comprise suitable logic, circuitry, and/or code that may enable communication with the host 152. In this regard, the NIHW device 104 may enable communication with the CPU 156, the memory 158, and/or the chipset 160. In some instances, the number of network connections that may be supported by the NIHW device 154 may be different than the number of network connections that may be supported by the host 152. For example, when the host 152 supports 10,000 connections and the NIHW device 154 supports 1,000 connections, then a connection ratio of 10:1 is supported by the networking system 150. In another example, if the host 152 supports 2,000 connections and the NIHW device 104 supports 1,000 connections, then a connection ratio of 2:1 is supported by the networking system 150. The connection ratio of a networking system that comprises a host and an NIHW device may be utilized when determining a connection setup model for a particular application.

Figure 1C:
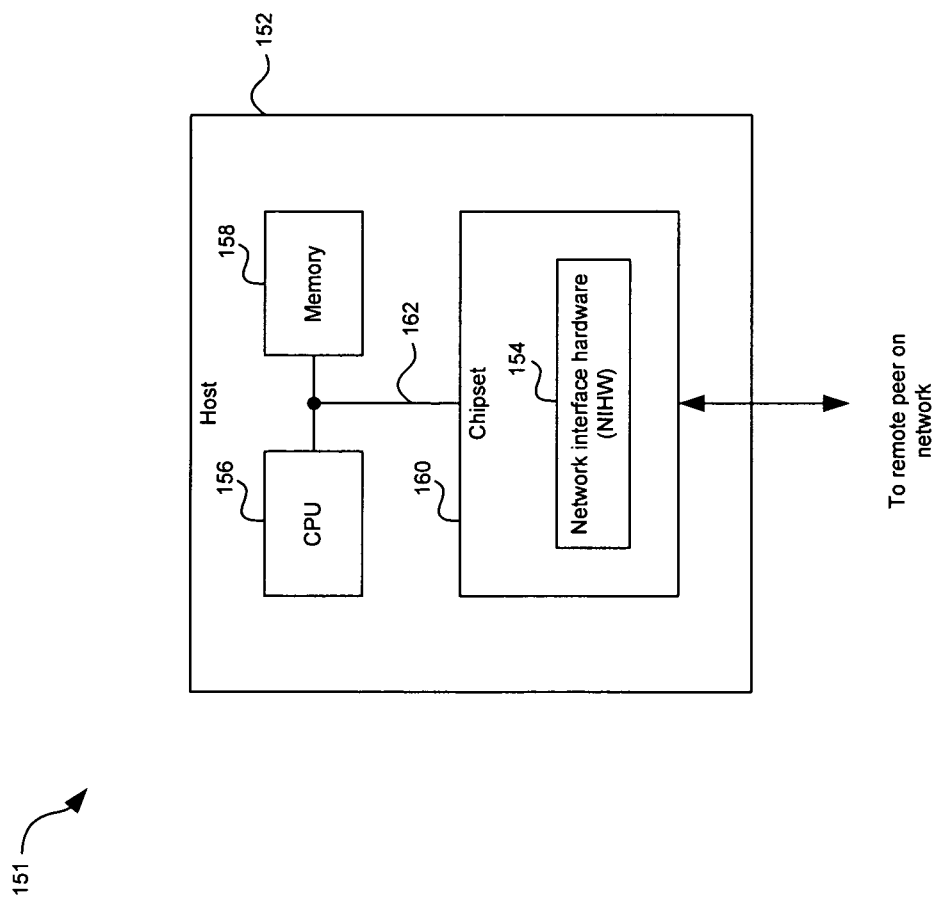
FIG. 1C is a block diagram illustrating a host with a network interface hardware block integrated within a chipset, in accordance with an embodiment of the invention.

FIG. 1C is a block diagram illustrating a host with a network interface hardware block integrated within a chipset, in accordance with an embodiment of the invention. Referring to FIG. 1C, there is shown a networking system 151 that may differ from the networking system 150 in FIG. 1B in that the NIHW device 154 in FIG. 1B is integrated into the chipset 160. In this regard, the NIHW device 154 may enable communication with other portions of the chipset 160, and with the CPU 156, and/or the memory 158 via the bus 162. The NIHW device 154 may comprise a classifier that may enable classification of received network packets.

Figure 1D:
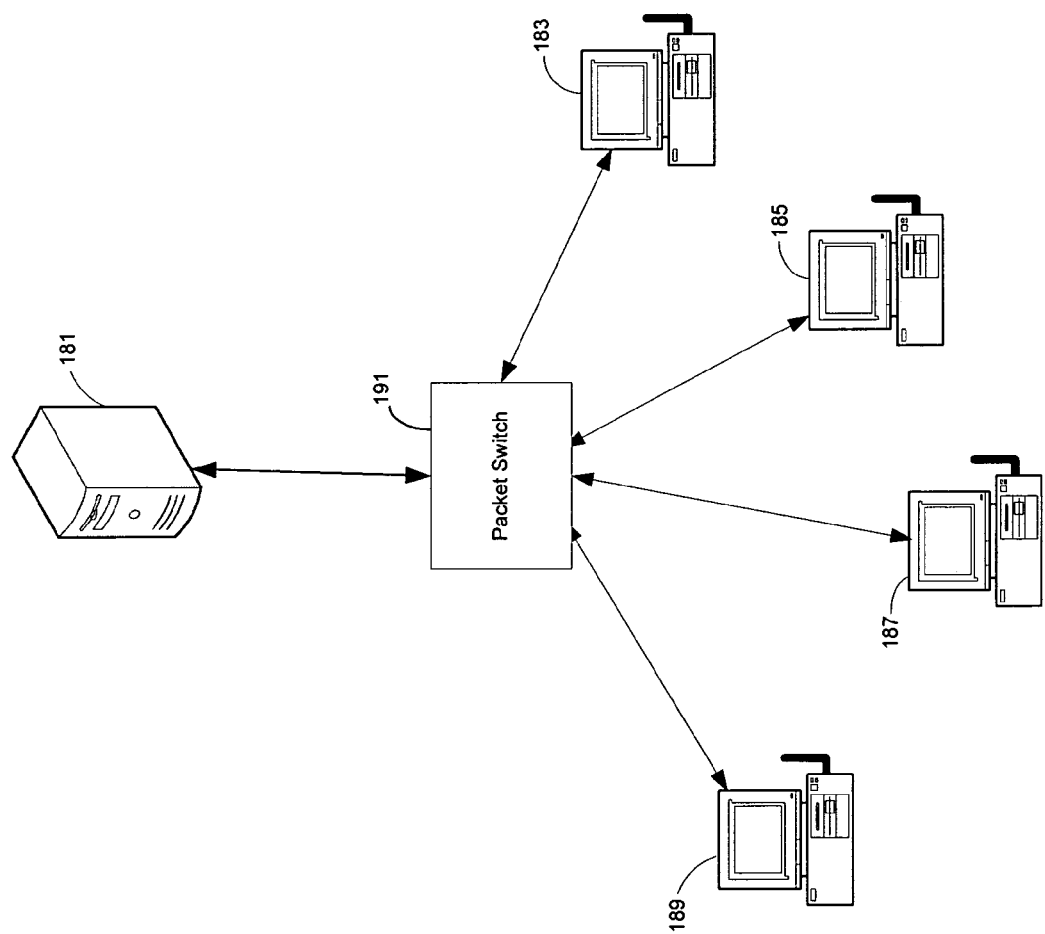
FIG. 1D is a block diagram of an exemplary packet switched network that may be utilized in accordance with an embodiment of the invention.

FIG. 1D is a block diagram of an exemplary packet switched network that may be utilized in accordance with an embodiment of the invention. Referring to FIG. 1D, there is shown a host 181, a packet switch 191, and a plurality of clients, client 183, client 185, client 187 and client 189. The host 181 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

The plurality of clients 183, 185, 187 and 189 may comprise suitable logic, circuitry and/or code that may be located on the premises of a customer, for example, data termination equipment such as routers. The packet switch 191 may comprise suitable logic, circuitry and/or code that may be enabled to provide clocking and switching services in a network. The plurality of clients 183, 185, 187 and 189 may be coupled to the packet switch 191 by a physical layer component and a link layer component. The physical layer component may define the mechanical, electrical, functional, and procedural specifications for the connection between the devices, for example, the RS-232 specification. The link layer component may define the protocol that establishes the connection between the plurality of clients 183, 185, 187 and 189 and the packet switch 191.

The host 181 may comprise suitable logic, circuitry and/or code that may be enabled to limit its new connection acceptance rate or the number of suspected frames of a known profile, for example, Internet control message protocol (ICMP) in order to make sure that attacks may not disrupt its service level to legitimate clients.

Figure 2:
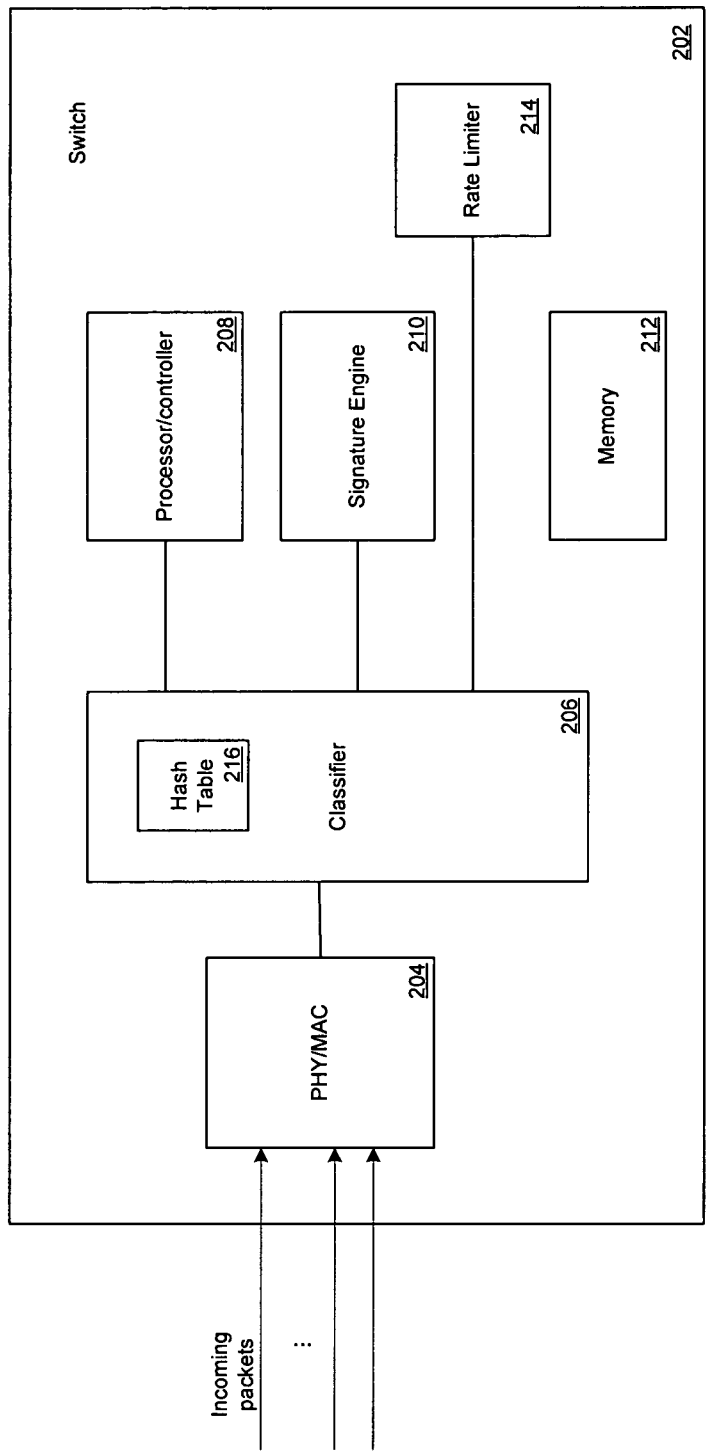
FIG. 2 is a diagram that illustrates a system for passive loop detection and prevention, in accordance with an embodiment of the invention.

FIG. 2 is a diagram that illustrates a system for passive loop detection and prevention, in accordance with an embodiment of the invention. Referring to FIG. 2, there is shown a switch 202. The switch 202 comprises a physical (PHY)/(medium access control) MAC layer block 204, a packet classifier 206, a processor/controller 208, a signature engine 210, a rate limiter 214 and a memory 212. The packet classifier 206 may comprise a hash table 216.

The PHY/MAC layer block 204 may comprise suitable logic, circuitry and/or code that may enable managing and maintaining of communications between base stations by coordinating access to a shared channel, for example, a wired channel or a wireless channel and utilizing protocols that enhance communications over a network medium. The PHY/MAC layer block 204 may receive the incoming network packets and may output the received packets to the classifier 206.

The PHY/MAC layer block 204 may also enable power control operations by disabling or enabling portions of a switch port's transmission and/or reception functionalities, for example. The PHY/MAC layer block 204 may receive control signals from the processor/controller 208 for performing power control operations. In this regard, the PHY/MAC layer block 204 may enable a power saving mode in a port when it disables portions of a port's transmission and/or reception functionalities. An exemplary power saving mode may require the PHY/MAC layer block 204 to disable portions of the transmission functionalities, such as a transmission amplifier, for example, while maintaining active most or all reception functionalities in order to determine when traffic or communication data is being received by the port from a remote client, for example. When active transmission from the port is to occur, the PHY/MAC layer block 204 may disable the power saving mode by enabling the transmission functionalities, for example. However, power saving modes need not be limited in this regard. Moreover, there may be more than one power savings mode associated with any switch port in the switch 202. In this regard, each power saving mode that may be associated with a switch port may refer to a set of functionalities that may be disabled in the switch port.

The PHY/MAC layer block 204 may also perform power control operations without the need for control signals from the processor/controller 208. In this regard, the PHY/MAC layer block 204 may utilize a passive mechanism where it may disable at least a portion of the functionalities in a switch port when it determines that no traffic flow is occurring at the switch port. Similarly, the PHY/MAC layer block 204 may enable any of the disabled functionalities of the switch port when it determines that traffic flow is occurring at the switch port.

The packet classifier 206 may comprise suitable logic, circuitry and/or code that may enable classification of received network packets. There is an increased likelihood of having collisions between the received network packets if, for example, a 4 byte cyclic redundancy check (CRC) is utilized, due to the limited number of bits being used. A 64 byte CRC may be utilized to reduce the likelihood of collisions between the network packets. To further decrease the likelihood of collisions, the CRC may be combined with other packet information to generate CRC-like hash information. A CRC is a type of hash function used to produce a checksum, which is a small, fixed number of bits against a block of data, such as a packet of network traffic. The checksum may be used to detect and correct errors after transmission or storage. A CRC may be computed and appended before transmission or storage, and verified afterwards by a recipient in order to confirm that no changes have occurred to the block of data during transmission.

The classification operations performed by the packet classifier 206 may be utilized to determine whether there is communication or traffic flow occurring in a switch port. For example, the CRC and packet information detected by the packet classifier 206 may indicate the occurrence of traffic flow in a switch port associated with the content of the classified packet type. A packet type detected by the packet classifier 206 may be associated with a particular switch port. A switch port may also communicate content associated with a particular application. Detecting a particular packet type may result in the awareness by the switch 202 that content associated with an application is being communicated via a particular switch port.

The hash table 216 may be utilized to track a finite number of connection flows. For example, hashed entries for 5000 connection flows may be tracked and once the hash table is filled, a FIFO mechanism may be utilized to purge or eliminate older entries from the hash table in order to make space for newly hashed entries. The hash table 216 may be a data structure that associates keys with values. The hash table 216 may support lookup operations by transforming the key using a hash function into a hash, a number that the hash table 216 uses to locate the desired value.

The processor/controller 208 may comprise suitable logic, circuitry, and/or code that may enable supporting of the management function to keep track of connections or traffic flows at the macro-level state. The macro-level state may indicate that only partial context information is maintained for each connection. In this regard, the processor/controller 208 may utilize results from the packet classification performed by the packet classifier 206 and/or results from the operations of the signature engine 210, for example, to determine whether traffic flow is occurring in any of the switch ports in the switch 202.

When traffic or communication flow is not detected, the processor/controller 208 may enable active mechanisms for placing the PHY/MAC layer block 204 in a power saving mode, for example. In this regard, the processor/controller 208 may utilize information generated by the classifier 206 and/or signature engine 210 to indicate to the PHY/MAC layer block 204 to place a switch port in a power savings mode. In this regard, the processor/controller 208 may generate signals that enable the PHY/MAC layer block 204 to implement power control operations such as disabling at least a portion of the switch port functionality, such as transmission and/or reception operations, for example. The processor/controller 208 may also enable generating signals, which indicate to the PHY/MAC layer block 204 to disable the power control operations when the processor/controller 208 determines that traffic is flowing via the disabled switch port.

The signature engine 210 may comprise suitable logic, circuitry and/or code that may enable examining of the packets for each connection flow and generate various keys based on the hashed values of the CRC, for example. The rate limit engine 214 may comprise suitable logic, circuitry and/or code that may provide an enforcement function to limit a rate of various connections to a specified rate based on results from the packet classifier 206. It may be more efficient to throttle back a data rate that is associated with a connection than terminating a connection associated with a loop. For example, if a loop is detected for a particular connection, the rate limiter 214 may enable reduce a transmission rate of the connection from a million frames per second to 500 frames per second, for example.

The memory 212 may comprise suitable logic, circuitry and/or code that may enable storage of hash information used for generating the CRC or CRC-type hash information. There may be a tradeoff between accuracy and the amount of memory that is required to store hash information used for generating the CRC or CRC-type hash information.

Figure 3A:
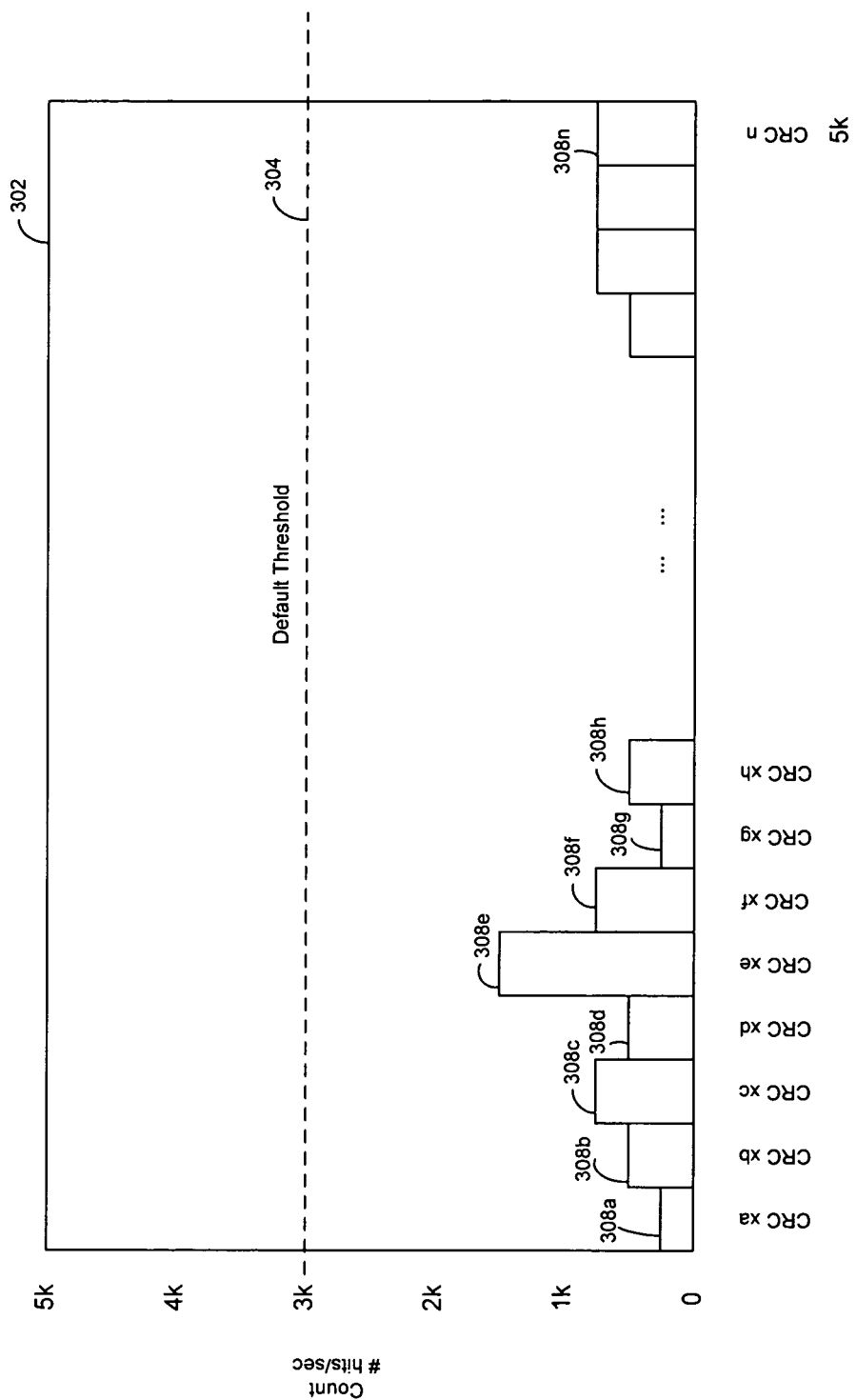
FIG. 3A is a diagram that illustrates an exemplary management function, in accordance with an embodiment of the invention.

FIG. 3A is a diagram that illustrates an exemplary management function, in accordance with an embodiment of the invention. Referring to FIG. 3A, there is shown a graph 302 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . , CRC n. The vertical axis illustrates the count for each of the corresponding occurrences of the hashed CRC values CRC xa 308a, CRC xb 308b, CRC xc 308c, CRC xd 308d, CRC xe 308e, CRC xf 308f, CRC xg 308g, CRC xh 308h, . . . , CRC n 308n. Initially, the hash table may be populated with CRC hash entries until it is full. FIG. 3A illustrates a steady state condition in which there are 5000 entries in the hash table, for example. There is a default threshold 304 of 3000 packets per second, for example. Once the hash table is full, various mechanisms may be utilized to purge or otherwise remove entries from the hash table to make room for newly generated hash entries. For example, a FIFO mechanism may be utilized to remove hash entries. In this regard, the oldest entries in the hash table may be purged or otherwise removed first to make room for the newly generated CRC hash entries.

The first time a particular CRC hash is generated; it may be entered in the hash table with a count of 1. The second time that same CRC hash is generated; the count for that CRC hash entry may be incremented. Subsequent occurrences may result in the count for that CRC hash entry being incremented. In one embodiment of the invention, a threshold may be established for the CRC hash entries. If the rate of the packets exceeds an established threshold, then this may trigger an action such as a reduction in the data rate or terminating the connection.

Figure 3B:
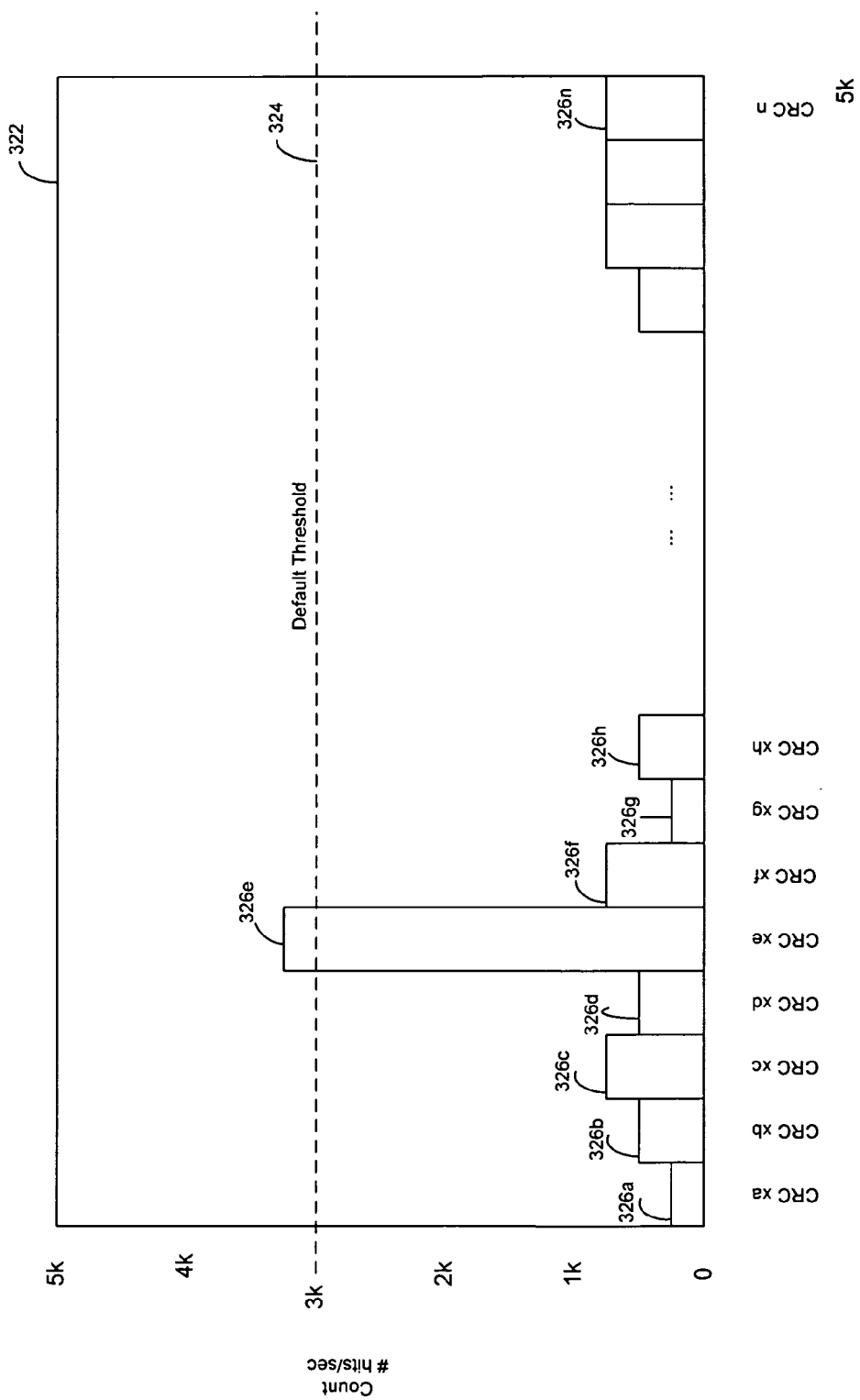
FIG. 3B is a diagram that illustrates an exemplary scenario of a management function in which the default threshold has been exceeded, in accordance with an embodiment of the invention.

FIG. 3B is a diagram that illustrates an exemplary scenario of a management function in which the default threshold has been exceeded, in accordance with an embodiment of the invention. Referring to FIG. 3B, there is shown a graph 322 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . , CRC n. The vertical axis illustrates the count for each of the corresponding occurrences of the hashed CRC values CRC xa 326a, CRC xb 326b, CRC xc 326c, CRC xd 326d, CRC xe 326e, CRC xf 326f, CRC xg 326g, CRC xh 326h, . . . , CRC n 326n.

FIG. 3B illustrates an exemplary scenario in which the number of occurrences of CRC xe 326e exceeds the default threshold 324. Once a threshold has been exceeded, then at least one of a plurality of actions may be triggered and executed by either the rate limiter 214 (FIG. 2) and/or the processor/controller 208. These actions may comprise rate limiting, sending a management alarm, disabling one or more ports handling traffic in a loop, providing a visual or aural indication, and/or CPU redirect, for example.

A visual indication may comprise blinking a LED and an aural indication may comprise generating a beep. The blinking associated with a particular connection of the LED may follow a predefined sequence, for example. Rate limiting may involve blocking or dropping packets. With processor redirect, a copy of information in the hash table along with other connection context information may be copied or otherwise provided to the processor/controller 208 for further analysis. Based on this analysis, the processor/controller 208 may then determine how best to handle the condition and take appropriate actions. The processor/controller 208 may provide an indication to the rate limiter 214, which may instruct the rate limiter 214 to adjust a rate of the corresponding connection accordingly. Context information such as a source port and a destination port, which may be associated with the hash entry for a particular packet, may be utilized to control a port. For example, the rate limiter 214 may use the source port or destination port to limit the data rate of the port or to disable the port.

Figure 3C:
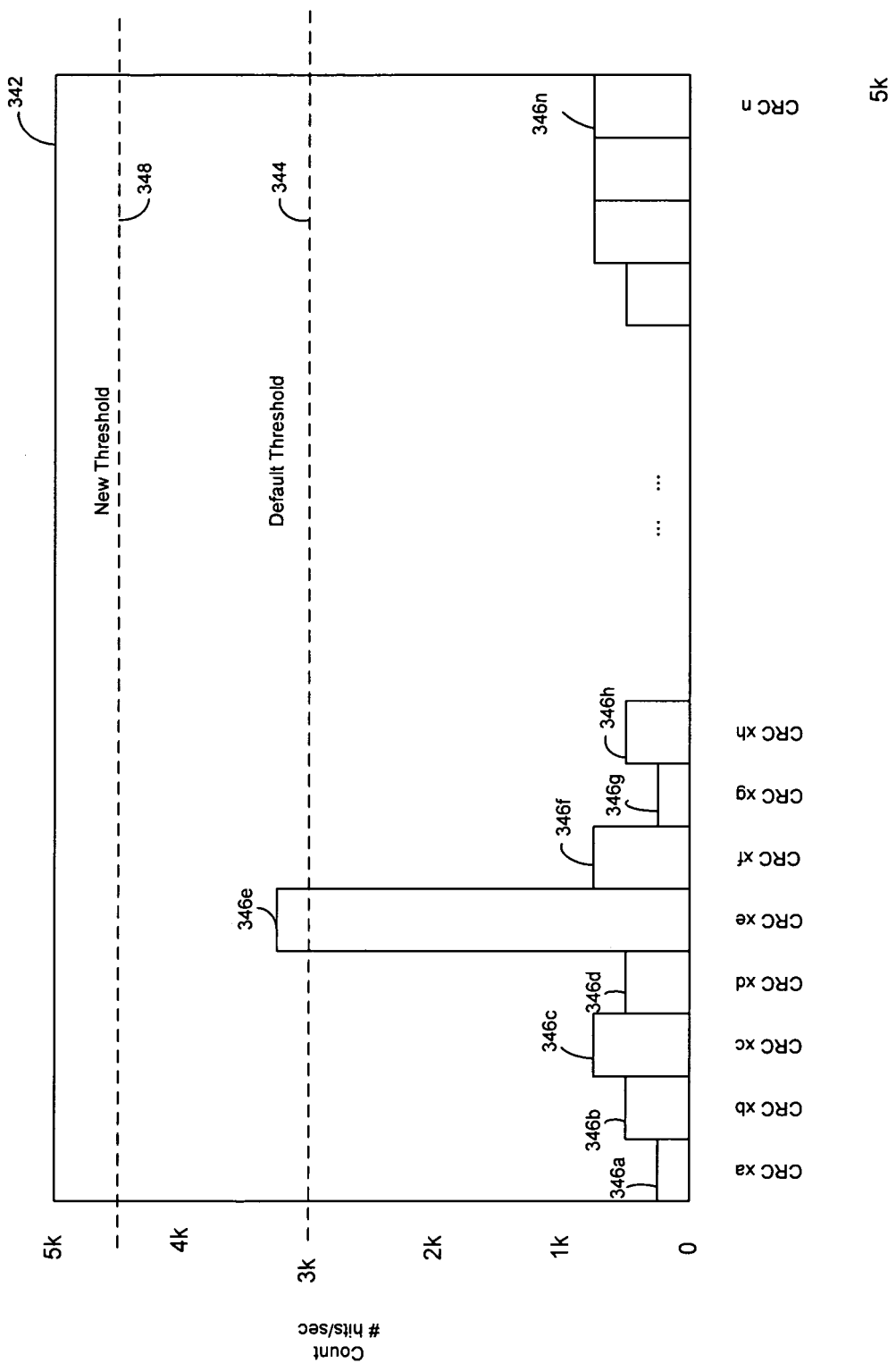
FIG. 3C is a diagram that illustrates an exemplary scenario of a management function with an adaptive threshold, in accordance with an embodiment of the invention.

FIG. 3C is a diagram that illustrates an exemplary scenario of a management function with an adaptive threshold, in accordance with an embodiment of the invention. Referring to FIG. 3C, there is shown a graph 342 illustrating a relationship between hashed CRC values and their corresponding counts or number of occurrences. The horizontal axis illustrates the hashed CRC value, namely, CRC xa, CRC xb, CRC xc, CRC xd, CRC xe, CRC xf, CRC xg, CRC xh, . . . , CRC n. The vertical axis illustrates the count for each of the corresponding occurrences of the hashed CRC values CRC xa 346a, CRC xb 346b, CRC xc 346c, CRC xd 346d, CRC xe 346e, CRC xf 346f, CRC xg 346g, CRC xh 346h, . . . , CRC n 346n. The number of occurrences of CRC xe 346e exceeds the default threshold 344. A new threshold 348 may be implemented at 4500 hits, for example, by the management function.

In this regard, the threshold may be dependent on the type of traffic handled by the connection. For example, if the traffic is largely multimedia traffic, and it is known that this type of environment is prone to loops, then the threshold may be increased to a higher level to more efficiently handle this type of traffic. For example, the threshold may be increased from 3000 to 4500, for example. At least one of a plurality of actions may be taken when a threshold has been reached. A default action may comprise executing a rate limiting action once a threshold has been exceeded. In certain instances, it may be appropriate to drop packets.

In another embodiment of the invention, the type of application running or the type of frame that is being detected may affect the action that may be taken by the processor/controller 208 and/or the rate limiter 214. For example, if a frame is a unicast frame, the threshold may be changed and/or the count modified to favor acceptance of these types of frames. For example, in the case of a unicast frame, the count may be incremented by, for example, every 5 unicast frames for a particular CRC hash value. However, if the frame is a broadcast frame, then the threshold and/or count may be modified to disfavor the acceptance of these types of frames.

Figure 4:
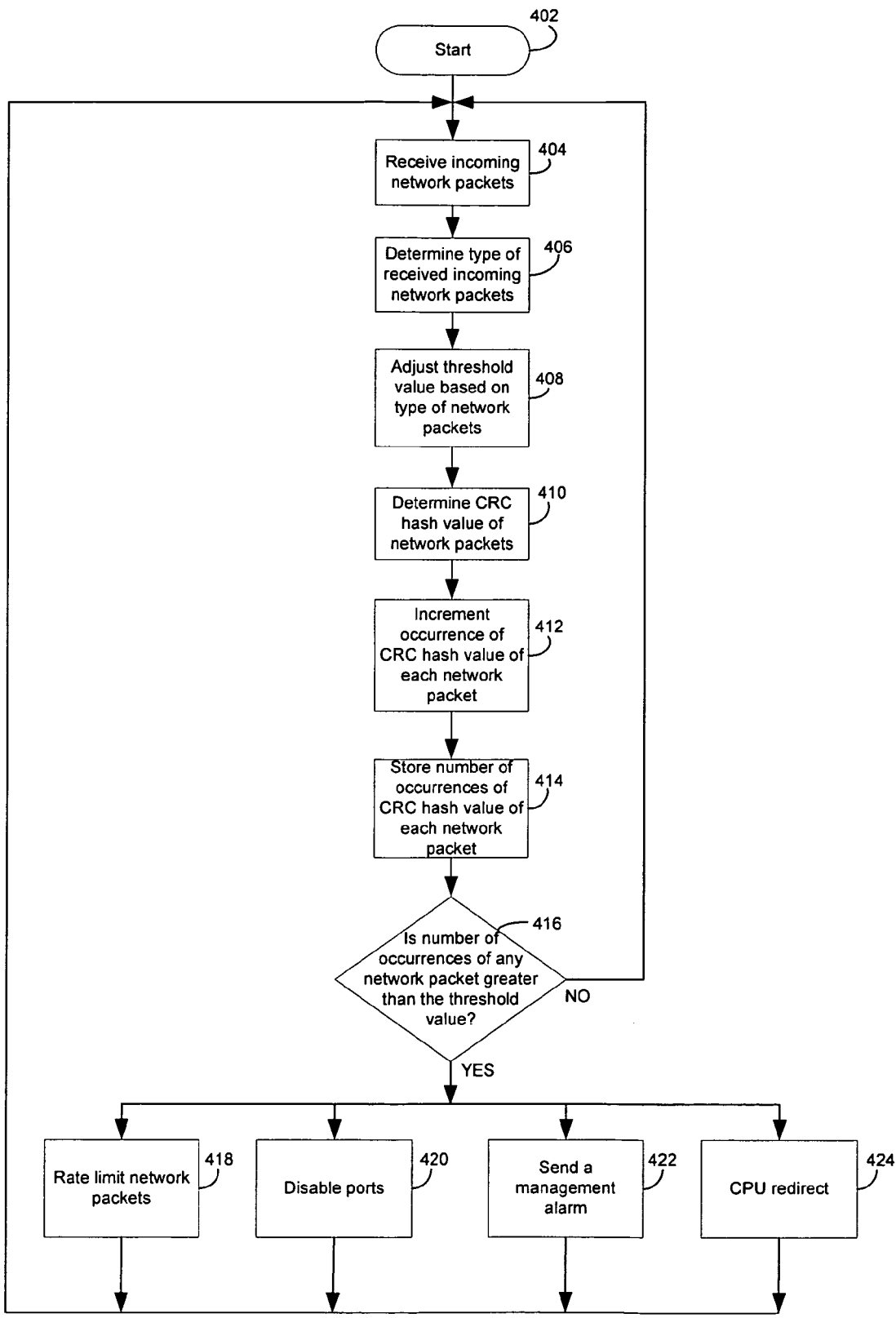
FIG. 4 is a flowchart illustrating a method for passive loop detection and prevention, in accordance with an embodiment of the invention.

FIG. 4 is a flowchart illustrating a method for passive loop detection and prevention, in accordance with an embodiment of the invention. Referring to FIG. 4, exemplary steps may begin at step 402. In step 404, a plurality of network packets may be received at a port in a switching device. In step 406, the type of at least a portion of the plurality of received packets may be determined. In step 408, a threshold value of the number of occurrences of the CRC hash value may be set based on the determined type of the portion of the plurality of received packets. For example, if the traffic is largely multimedia traffic, and it is known that this type of environment is prone to loops, then the threshold may be increased to a higher level to more efficiently handle this type of traffic. In step 410, a CRC hash value of each of the plurality of received network packets may be determined. In step 412, a counter may be incremented to indicate the number of occurrences of the CRC hash value of each of the plurality of received network packets. In step 414, the memory 212 may enable storage of the number of occurrences of the CRC hash value of each of the plurality of received network packets.

In step 416, it may be determined whether the number of occurrences of the CRC hash value of any of the plurality of received network packets is greater than the set threshold value. If the number of occurrences of the CRC hash value of at least one of the plurality of received network packets is not above the set threshold value, control returns to step 404. If the number of occurrences of the CRC hash value of at least one of the plurality of received network packets is above the set threshold value, control passes to at least one of steps 418, 420, 422, or 424.

In step 418, the rate of at least a portion of the plurality of received network packets at a port in a switching device may be adjusted, for example, by the rate limiter 214 (FIG. 2). Rate limiting may involve blocking or dropping packets, for example. In step 420, at least one of a plurality of ports handling at least one of the plurality of received network packets may be disabled. In step 422, a visual indication, for example, a blinking LED or an aural indication comprising generating a beep may be transmitted to the processor/controller 208. In step 424, a copy of information in the hash table along with other connection context information may be copied or otherwise provided to the processor/controller 208 for further analysis. Based on this analysis, the processor/controller 208 may then determine how best to handle the condition and take appropriate actions. The processor/controller 208 may provide an indication to the rate limiter 214, which may instructs the rate limiter 214 to adjust a rate of the corresponding connection accordingly. Control then returns to step 404.

In accordance with an embodiment of the invention, a method and system for passive loop detection and prevention in a packet network switch may comprise detecting a loop 110 within a switching device 102 in a communication network 108 based on a number of occurrences of at least a portion of a plurality of received network packets at a port, for example, port 1 106 or port 2 104 in a switching device 102. The rate at which at least a portion of the plurality of received network packets are handled may be adjusted at the port, for example, port 1 106 or port 2 104 in the switching device 102. At least one of the plurality of received network packets may be rate limited, for example, by the rate limiter 214 (FIG. 2), if the number of occurrences of a CRC hash value of at least one of the plurality of received network packets is above a first threshold value 324 (FIG. 3B). The system may comprise circuitry that enables determination of a cyclic redundancy check (CRC) hash value of each of the plurality of received network packets. The memory 212 may enable storage of a number of occurrences of the CRC hash value of each of the plurality of received network packets.

The classifier 206 may determine whether the number of occurrences of the CRC hash value of at least one of the plurality of received network packets is above a first threshold value 324. At least one of a plurality of ports handling at least one of the plurality of received network packets may be disabled, if the number of occurrences of the CRC hash value of at least one of the plurality of received network packets is above the first threshold value 324. The processor/controller 208 may enable adjustment of a threshold value of the number of occurrences of the CRC hash value of the plurality of received network packets based on a type of at least a portion of the plurality of received network packets. For example, if the processor/controller 208 determines that the traffic is largely multimedia traffic, and it is known that this type of environment is prone to loops, and then the threshold may be increased to a higher level to more efficiently handle this type of traffic.

Figure 5A:
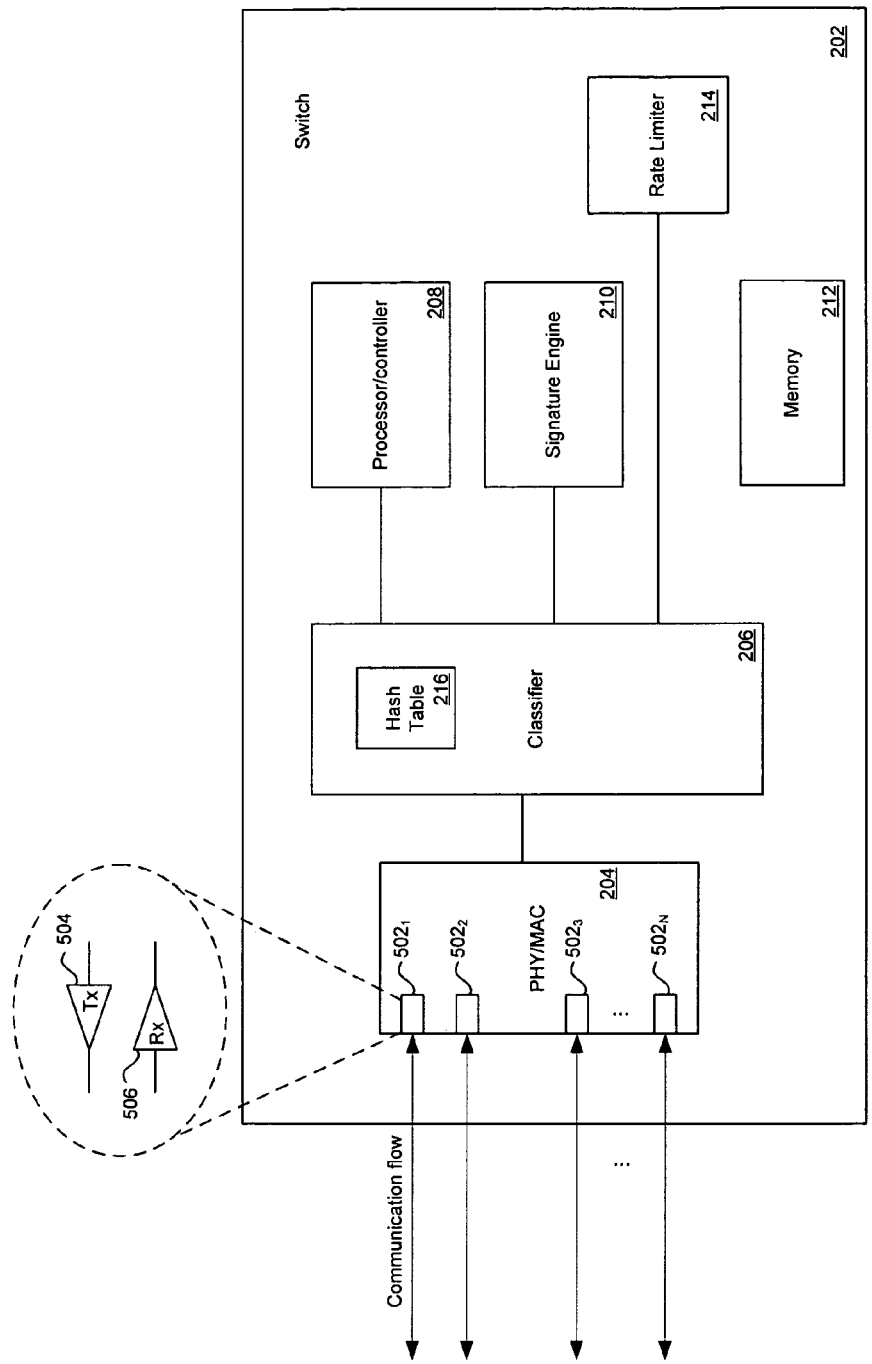
FIG. 5A is a diagram that illustrates a system for power control based on application awareness, in accordance with an embodiment of the invention.

FIG. 5A is a diagram that illustrates a system for power control based on application awareness, in accordance with an embodiment of the invention. Referring to FIG. 5A, there is shown the switch 202 in FIG. 2. The switch 202 may enable determining the traffic flow activity of a switch port based on its awareness, via packet type classification operations, for example, that content associated with an application that corresponds to the switch port is being received.

The PHY/MAC layer block 204 may comprise switch ports $502_1$ through $502_N$, for example. The PHY/MAC layer block 204 may enable control of each of the switch ports independently. Moreover, the PHY/MAC layer block 204 may enable control of at least a portion of each of the switch ports. In this regard, the PHY/MAC layer block 204 may perform power control operations on the switch ports $502_1$ through $502_N$ based on power control information provided by the processor/controller 208, that is, by active mechanisms, or by passive mechanisms where the PHY/MAC layer block 204 monitors traffic in each of the switch ports $502_1$ through $502_N$. The power control operations may be referred to as a power savings mode, for example. In a power savings mode, the switch port still needs to be operational but at a reduced power. The PHY/MAC layer block 204 may also enable setting the communication rate in a switch port as part of the power control operations that may be implemented during a power savings mode.

Each of the switch ports may comprise suitable logic, circuitry, and/or code that may enable data transmission and/or reception functionalities. For example, each switch port may comprise at least one pair of a transmission circuitry 504 and a reception circuitry 506. The transmission circuitry 504 may enable amplification and/or processing of the signals for transmission. The reception circuitry 502 may enable amplification and/or processing of received signal for further processing in the switch 202. The switch ports may support the TCP/IP connections, such as Ethernet connections, for example. In Gigabit Ethernet applications, for example, a switch port may comprise four pairs of transmission and reception circuitry.

In accordance with an embodiment of the invention, reduced power may be achieved by disabling the functionality of at least a portion of a pair of transmission and reception circuitry when multiple pairs are available in the port. In another embodiment of the invention, reduced power may be achieved by reducing the communication speed setting to a lower rate. For example, a switch port operating at 10 Gbps may consume power even when no traffic is flowing. Reducing the communication speed to 1 Gbps may reduce power consumption to approximately a tenth ($\frac{1}{10}$) of the power consumed when operating at 10 Gbps. Moreover, reducing the communication speed further to 100 Mbps may further reduce power consumption to approximately a hundredth ($\frac{1}{100}$) of the power consumed when operating at 10 Gbps. In this regard, it may be possible to change the speed setting in a switch port during a power savings mode when there is no active traffic that requires a large bandwidth.

Power control operations, such as enabling a power savings mode or reducing the communication rate, need be transparent to the rest of the network. In this regard, implementation of power control operations need not change the link status of the corresponding switch port. Power control operations may also be enabled in the case of a power outage, for example. If a power outage occurs, each of the switch ports may be controlled to operate at a lower power consumption as the switch is running of a secondary power source such as a UPS, for example. The power control operations may be triggered internally to the switch, based on a message from the UPS, and/or based on messages from other power monitoring devices, for example.

This approach may require intelligence, such as spanning tree protocol frames and/or other traffic management, for example, regarding which application is active based on contact background traffic flowing. Generally, this type of traffic need not require much bandwidth, but it does that the power control operations enable the link to remain up/active. For example, during off-peak hours of operation, such as at night, when traffic volumes are generally lower, a switch port supporting Gigabit Ethernet IP telephony with no traffic or communication flow may be placed in the lowest power saving mode in order to conserve the largest amount of energy. A Gigabit Ethernet port may have several levels of power consumption since more than one transmission and reception pair is generally available.

In accordance with an embodiment of the invention, knowledge of the type of traffic flowing through a switch port may be utilized to determine whether power control operations, such as enabling a power savings mode, may be applicable to the switch port. For example, when a network file system (NFS) port in the switch is in operation and no communication traffic is detected for a time period, whether by active or passive mechanisms, the NFS port need not be placed in a power saving mode because of the high start up energy cost associated with getting the NFS port running at peak performance. In this regard, the switch 202 may determine which of the switch ports $502_1$ through $502_N$ under the appropriate traffic or communication flow conditions.

Figure 5B:
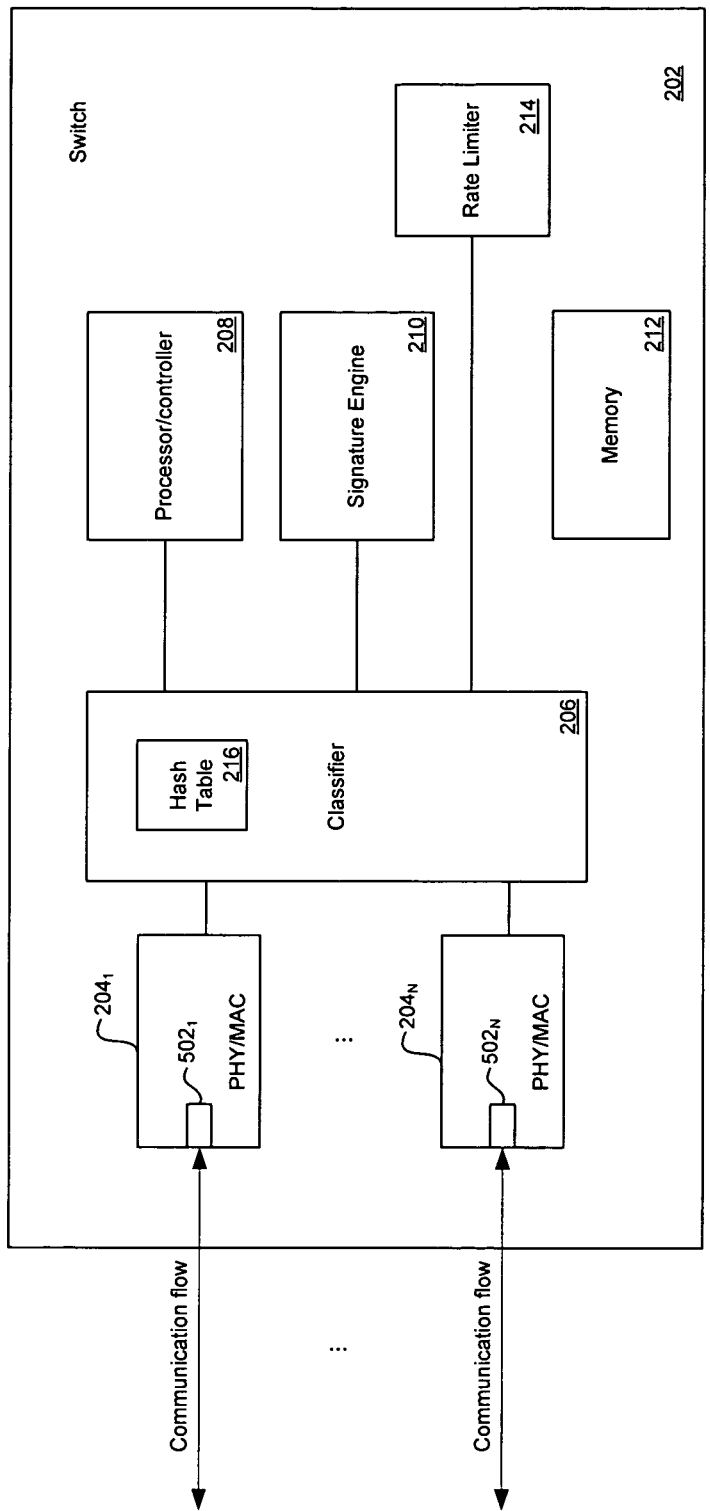
FIG. 5B is a diagram that illustrates another system for power control based on application awareness, in accordance with an embodiment of the invention.

FIG. 5B is a diagram that illustrates another system for power control based on application awareness, in accordance with an embodiment of the invention. Referring to FIG. 5B, there is shown the switch 202 comprising a plurality of PHY/MAC layer blocks $204_1$ through $204_N$, wherein each PHY/MAC layer block supports a single switch port in the switch 202. Each of the PHY/MAC layer blocks $204_1$ through $204_N$ may be the same or substantially similar to the PHY/MAC layer block 204 described with respect to FIGS. 2 and 5A, for example. In this regard, each PHY/MAC layer blocks $204_1$ through $204_N$ may monitor traffic or communication block in the corresponding switch port. For example, PHY/MAC layer block $204_1$ may monitor traffic in the switch port $502_1$ and may passively enable a power savings operation or mode in the switch port $502_1$ when appropriate. Moreover, the PHY/MAC layer block $204_1$ may receive control information from the processor/controller 208 for enabling power control operations on the switch port $502_1$.

Figure 6A:
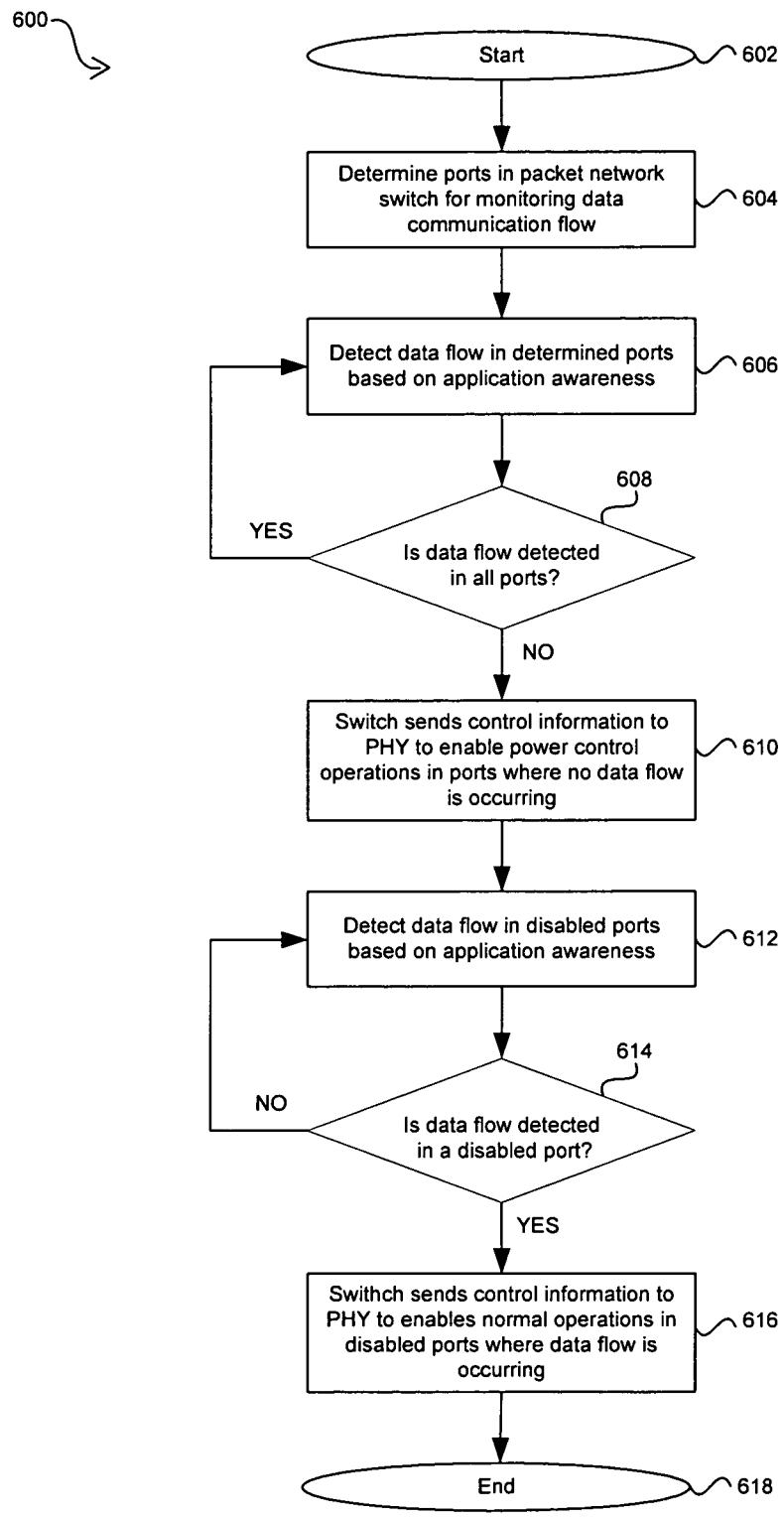
FIG. 6A is a flow diagram that illustrates active power control operations when communication flow is not detected in at least one packet network switch port, in accordance with an embodiment of the invention.

FIG. 6A is a flow diagram that illustrates active power control operations when communication flow is not detected in at least one packet network switch port, in accordance with an embodiment of the invention. Referring to FIG. 6A, there is shown a flow diagram 600. After start step 602, in step 604, a determination is made based on the type of traffic, that is, the detection of packet types associated with particular switch ports, operating conditions, and/or startup energy costs, for example, as to whether all switch ports may be monitored for traffic or communication flow. In this regard, the switch, such as the switch 202 in FIGS. 2, 5A, and 5B, for example, may store information that indicates for switch ports power control operations, such as enabling a power savings mode, may be available. In step 606, traffic or data flow may be detected in the switch ports being monitored as a result of step 604 based on the traffic analysis operations of the classifier 206 and/or the signature engine 210, for example. Based on the traffic analysis, such as packet classification, for example, the switch 202 of communication may be aware of communication or flow of content associated with an application. In this regard, the switch 202 may utilize application awareness to determine which switch ports are actively communicating. In step 608, when switch ports show traffic flowing, the process may return to step 606 where the monitoring of the switch ports may continue. When at least one of the switch ports is detected as not having traffic or communication flow through it, the process may proceed to step 610.

In step 610, the processor/controller 208 may communicate control information to the PHY/MAC layer block 204 to change the switch ports where there is no current data flow to perform power control operations, that is, to disable portions of the functionality of the switch port operation. In this regard, the PHY/MAC layer block 204 may utilize different power saving mode levels and/or reduction in communication rate to disable at least some functionality in the port in accordance with the type of traffic supported by the switch port. In step 612, the disabled switch ports operating in a power saving mode may continue to be monitored in order to detect when traffic or data communication flow may occur again. In step 614, when data flow is not detected in a disabled switch port, that is, a port operating in a power saving mode, the process may return to step 612 where monitoring of the disabled switch ports may continue. When data flow is detected in a disabled switch port, the process may proceed to step 616. In step 616, the processor/controller 208 may communicate control information to the PHY/MAC layer block 204 to change a disabled switch port from a power saving mode to a normal mode of operation for switch ports where there is data flow. In this regard, a normal mode of operation may refer to operations that enable full transmission and/or reception functionalities in the switch port. After step 616, the process may proceed to end step 618.

Figure 6B:
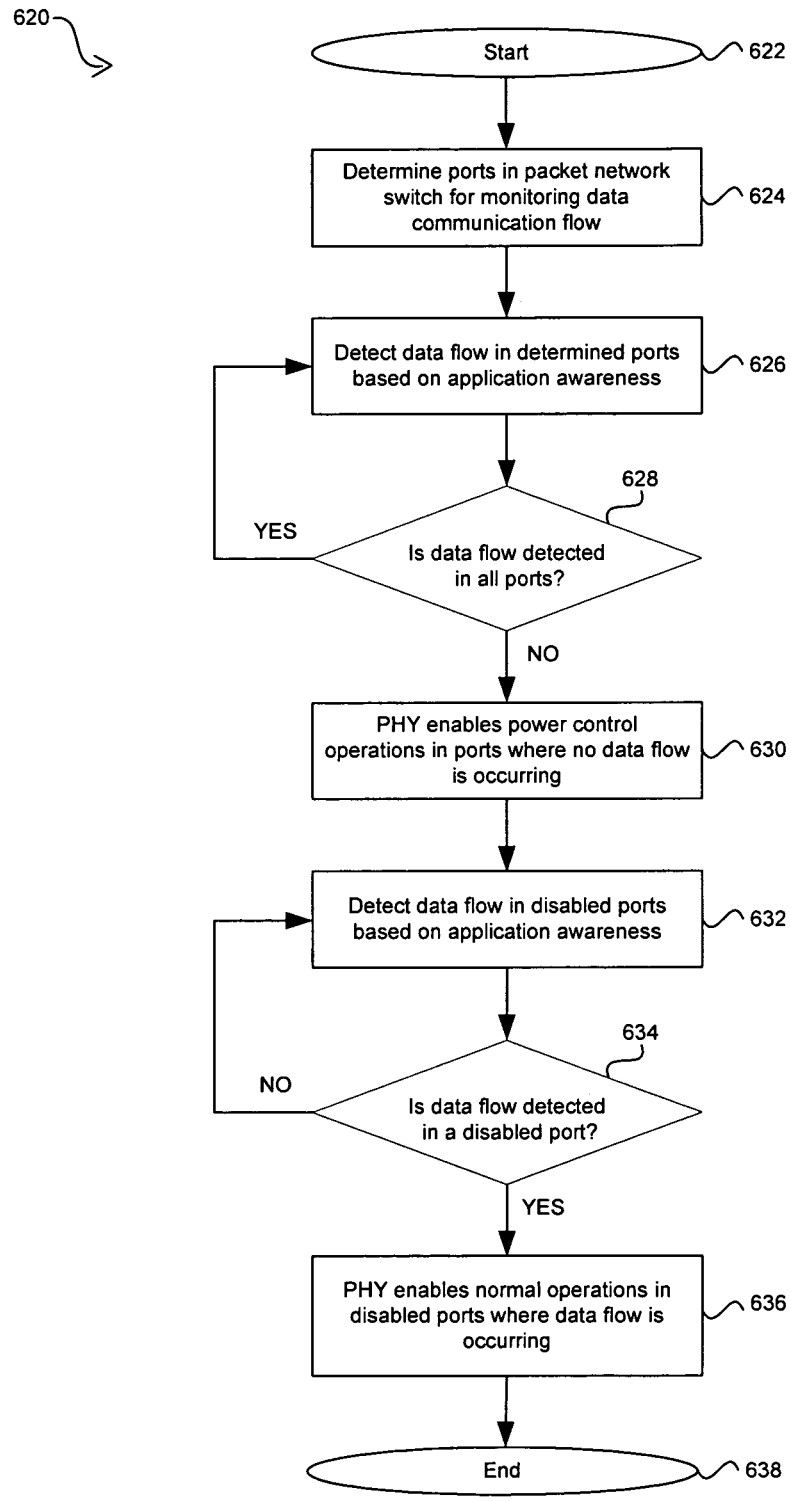
FIG. 6B is a flow diagram that illustrates passive power control operations when communication flow is not detected in at least one packet network switch port, in accordance with an embodiment of the invention.

FIG. 6B is a flow diagram that illustrates passive power control operations when communication flow is not detected in at least one packet network switch port, in accordance with an embodiment of the invention. Referring to FIG. 6B, there is shown a flow diagram 620. After start step 622, in step 624, a determination is made based on the type of traffic, operating conditions, and/or startup energy costs, for example, as to whether switch ports may be monitored for traffic or communication flow. In this regard, the switch, such as the switch 202 in FIGS. 2, 5A, and 5B, for example, may store information that indicates for switch ports power control operations, such as enabling a power savings mode, may be available. In step 626, traffic or data flow may be detected by passive mechanisms within the PHY/MAC layer block 204. For example, the PHY/MAC layer block 204 may determine that traffic or data communication flow has not occurred for a time period. In step 628, when switch ports show traffic flowing, the process may return to step 626 where the monitoring of the switch ports by the PHY/MAC layer block 204 may continue. When at least one of the switch ports is detected as not having traffic or communication flow through it by the PHY/MAC layer block 204, the process may proceed to step 630.

In step 630, the PHY/MAC layer block 204 may change the switch ports where there is no current data flow to perform power control operations, that is, to disable portions of the functionality of the switch port operation. This change may occur without active participation from the processor/controller 208, for example, and as a result may be referred to as being passive. In this regard, the PHY/MAC layer block 204 may utilize different power saving mode levels and/or reduction in communication rate to disable at least some functionality in the port in accordance with the type of traffic supported by the switch port. In step 632, the disabled switch ports operating in a power saving mode may continue to be monitored in order to detect when traffic or data communication flow may occur again. In step 634, when the PHY/MAC layer block 204 does not detect data flow in a disabled switch port, that is, in a port operating in a power saving mode, the process may return to step 632 where monitoring of the disabled switch ports may continue. When the PHY/MAC layer block 204 detects data flow in a disabled switch port, the process may proceed to step 636. In step 616, the PHY/MAC layer block 204 may change a disabled switch port from a power saving mode to a normal mode of operation for those switch ports where there is data flow. In this regard, a normal mode of operation may refer to operations that fully enable transmission and/or reception functionalities in the switch port. After step 636, the process may proceed to end step 638.

Figure 6C:
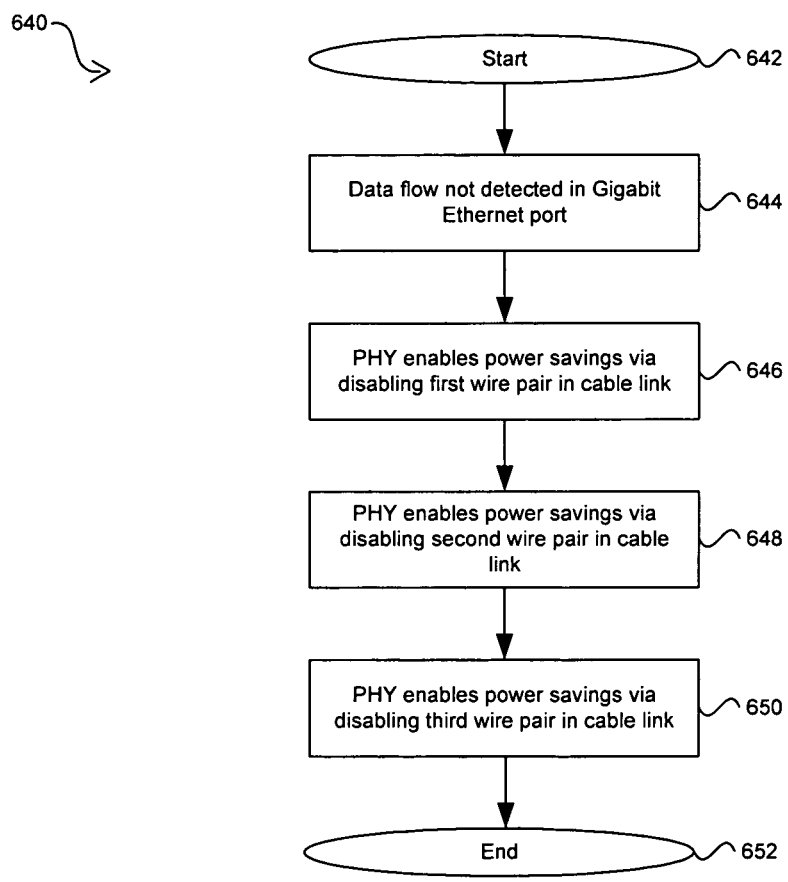
FIG. 6C is a flow diagram that illustrates passive power control operations when communication flow is not detected in a Gigabit Ethernet port, in accordance with an embodiment of the invention.

FIG. 6C is a flow diagram that illustrates passive power control operations when communication flow is not detected in a Gigabit Ethernet port, in accordance with an embodiment of the invention. Referring to FIG. 6C, there is shown a flow diagram 640. After start step 642, in step 644, a determination has been made that traffic or data communication flow is not detected in a Gigabit Ethernet switch port. The Gigabit Ethernet port may communicate via a cable link comprising four (4) pairs of wires, wherein all 4 pairs are utilized to achieve gigabit/sec speeds. For example, each pair of wires may support approximately 250 Mbit/sec speeds. When the PHY/MAC layer block 204 does not receive control indication from the switch, that is, from the processor/controller 208, then the PHY/MAC layer block 204 may utilize a passive mechanism to reduce power consumption. For example, in step 646, the PHY/MAC layer block 204 may wait for a time period and if no traffic is received in the Gigabit Ethernet switch port, the PHY/MAC layer block 204 may enable a power control operations by disabling communication via the first wire of the cable link. This approach may reduce the communication rate of the port by 250 Mbits/sec, for example.

In step, 648, the PHY/MAC layer block 204 may wait for an additional time period and if no traffic is received in the Gigabit Ethernet switch port, the PHY/MAC layer block 204 may enable a power control operations by disabling communication via the second wire of the cable link. This approach may further reduce the communication rate of the port by 250 Mbits/sec, for example. Similarly, in step 650 the PHY/MAC layer block 204 enable a power control operations by disabling communication via the third wire of the cable link after waiting for additional periods of time and not detecting any received traffic. This approach may further reduce the communication rate of the port by 250 Mbits/sec, for example, allowing the port to maintain a fourth wire of the cable link available for monitoring traffic flow. In end step 652, if traffic is detected after step 650, the PHY/MAC layer block 204 may return the Gigabit Ethernet switch port to a normal mode of operation by enabling all disabled wires either concurrently or sequentially.

The approach described above enables a network switch that supports loop detection to utilize at least a portion of its operations to implement power control mechanisms that optimize power consumption in accordance with traffic demands.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, the method comprising:
   classifying, by a network switch, data flow received via one or more of a plurality of ports of said network switch;
   discovering, by said network switch, which one or more service applications running on one or more first network devices coupled to said network switch are associated with said data flow, wherein:
   said discovering is based on said classifying; and
   said service applications provide services to one or more second network devices via said network switch;
   discovering which at least one of said plurality of ports of said network switch corresponds to said discovered one or more service applications associated with said data flow; and
   disabling or slowing down, by said network switch, one or more portions of circuitry associated with said at least one of said plurality of ports of said network switch based on said discovered one or more service applications associated with said data flow.

2. The method according to claim 1, wherein said plurality of ports are Ethernet ports.

3. The method according to claim 1, comprising, where said one or more portions of said circuitry comprises a plurality of portions, sequentially disabling two or more of said plurality of portions of circuitry.

4. The method according to claim 1, comprising determining when to enable said disabled one or more portions of said based on said discovered one or more service applications associated with said data flow.

5. The method according to claim 1, comprising, where said one or more portions of said circuitry comprises a plurality of portions, sequentially enabling two or more disabled ones of said plurality of portions of circuitry.

6. The method according to claim 1, wherein said circuitry associated with said at least one port is physical layer circuitry.

7. A non-transitory computer-readable medium having stored thereon, a computer program having at least one code section, the at least one code section being executable by a computer for causing the computer to perform steps comprising:
   classifying, by a network switch, data flow received via one or more of a plurality of ports of said network switch;
   discovering, by said network switch, which one or more service applications running on one or more first network devices coupled to said network switch are associated with said data flow, wherein:
   said discovering is based on said classifying; and
   said service applications provide services to one or more second network devices via said network switch;
   discovering which at least one of said plurality of ports of said network switch corresponds to said discovered one or more service applications associated with said data flow; and
   disabling or slowing down, by said network switch, one or more portions of circuitry associated with at least one of said plurality of ports of said network switch based on said discovered one or more service applications associated with said data flow.

8. The non-transitory computer-readable medium according to claim 7, wherein said plurality of ports are Ethernet ports.

9. The non-transitory computer-readable medium according to claim 7, wherein said one or more portions of said circuitry comprises a plurality of portions, and said at least one code section comprises code for sequentially disabling two or more of said plurality of portions of said circuitry.

10. The non-transitory computer-readable medium according to claim 7, wherein said at least one code section comprises code for determining when to enable said disabled one or more portions of said circuitry based on said discovered one or more service applications associated with said data flow.

11. The non-transitory computer-readable medium according to claim 7, wherein said one or more portions of said circuitry comprises a plurality of portions, and said at least one code section comprises code for sequentially enabling two or more disabled ones of said plurality of portions of said circuitry.

12. The non-transitory computer-readable medium according to claim 7, wherein said circuitry associated with said at least one port is physical layer circuitry.

13. A system for, the system comprising:
    one or more processors and/or circuits for use in a network switch, wherein said one or more processors and/or circuits comprise circuitry associated with at least one of a plurality of ports of said network switch and said one or more processors and/or circuits are operable to:
    classify data flow received via one or more of said plurality of ports of said network switch;
    discover which one or more service applications running on one or more first network devices coupled to said network switch are associated with said data flow, wherein:
    said discovering is based on said classifying; and
    said service applications provide services to one or more second network devices via said network switch;
    discover which at least one of said plurality of ports of said network switch corresponds to said discovered one or more service applications associated with said data flow; and
    disable or slow down one or more portions of said circuitry associated with at least one of said plurality of ports of said network switch based on said discovered one or more service applications associated with said data flow.

14. The system according to claim 13, wherein said plurality of ports are Ethernet ports.

15. The system according to claim 13, wherein:
    said one or more portions of said circuitry comprises a plurality of portions of said circuitry; and said one or more processors and/or circuits are operable to sequentially disable two or more of said plurality of portions of said circuitry.

16. The system according to claim 13, wherein said one or more processors and/or circuits are operable to determine when to enable said disabled one or more portions of said circuitry based on said discovered one or more service applications associated with said data flow.

17. The system according to claim 13, wherein:
said one or more portions of said circuitry comprises a plurality of portions; and
said one or more processors and/or circuits are operable to sequentially enable two or more disabled ones of said plurality of portions of said circuitry.

18. The system according to claim 13, wherein said circuitry associated with said at least one port is physical layer circuitry.

19. The method according to claim 1, wherein said one or more portions of said circuitry comprises one or more amplifiers.

20. The non-transitory computer-readable medium according to claim 7, wherein said one or more portions of said circuitry comprises one or more amplifiers.

21. The system according to claim 13, wherein said one or more portions of said circuitry comprises one or more amplifiers.

* * * * *